United States Patent
Jones et al.

(10) Patent No.: US 7,896,038 B2
(45) Date of Patent: Mar. 1, 2011

(54) METHOD AND APPARATUS FOR DISPENSING FROZEN CONFECTIONARY

(75) Inventors: Allan S. Jones, Kingsport, TN (US); Jack F. Rutledge, Chattanooga, TN (US); James S. Wolf, Silver Lake, OH (US); Jeffrey L. Redington, Bellingham, WA (US)

(73) Assignee: Puffin Innovations, LLC, Awendaw, SC (US)

( * ) Notice: Subject to any disclaimer, the term of this patent is extended or adjusted under 35 U.S.C. 154(b) by 1037 days.

(21) Appl. No.: 11/669,768

(22) Filed: Jan. 31, 2007

(65) Prior Publication Data
US 2007/0267087 A1    Nov. 22, 2007

Related U.S. Application Data

(60) Provisional application No. 60/763,512, filed on Jan. 31, 2006, provisional application No. 60/858,417, filed on Nov. 9, 2006.

(51) Int. Cl.
*B65B 1/04* (2006.01)
(52) U.S. Cl. .................. 141/103; 141/9; 141/198; 99/450.1
(58) Field of Classification Search .............. 141/9, 141/95, 98, 100–105, 192, 198; 99/450.1
See application file for complete search history.

(56) References Cited

U.S. PATENT DOCUMENTS

| | | | |
|---|---|---|---|
| 2,728,306 A | 3/1949 | Tarr | |
| 3,876,110 A | 4/1975 | Logie | |
| 4,009,740 A * | 3/1977 | Michielli | 141/172 |
| 4,174,742 A | 11/1979 | Murphey | |
| 4,324,059 A | 4/1982 | Baum | |
| 4,645,093 A | 2/1987 | Jones | |
| 4,860,876 A | 8/1989 | Moore et al. | |
| 4,889,210 A | 12/1989 | Alcaraz et al. | |
| 4,942,910 A * | 7/1990 | Hamamura | 141/9 |
| 5,027,698 A | 7/1991 | Chirnomas | |
| 5,727,609 A * | 3/1998 | Knight et al. | 141/129 |
| 5,893,485 A * | 4/1999 | McGill | 222/95 |
| 5,959,869 A | 9/1999 | Miller et al. | |
| 6,328,180 B1 | 12/2001 | Sorensen et al. | |
| 6,390,334 B1 | 5/2002 | Kim et al. | |

(Continued)

FOREIGN PATENT DOCUMENTS

EP    1450318    8/2004

(Continued)

OTHER PUBLICATIONS

International Search Rpt., Sep. 24, 2007.

*Primary Examiner*—Timothy L Maust
(74) *Attorney, Agent, or Firm*—Sand & Sebolt

(57) ABSTRACT

A frozen confectionary vending machine employs robotics and other features to provide a customized frozen confectionary product, with or without toppings, in an entertaining environment. At least portions of the vending machine interior are visible to customers as the machine assembles a frozen confectionary product according to specifications selected by the customer. A robotic arm moves a product receptacle between various dispensing stations that dispense measured amounts of a frozen confectionary and one or more optional toppings into the receptacle. After assembly, the product is moved by the robotic arm to a product delivery port that provides customer access to the product in a sanitary manner.

26 Claims, 6 Drawing Sheets

U.S. PATENT DOCUMENTS

| | | |
|---|---|---|
| 6,513,677 B1 | 2/2003 | Sorensen et al. |
| 6,560,973 B2 * | 5/2003 | Jones et al. ............ 62/60 |
| 6,899,337 B2 | 5/2005 | Fisher et al. |
| 6,929,149 B2 | 8/2005 | Selfridge et al. |
| 7,052,728 B2 | 5/2006 | Kateman et al. |
| 7,128,237 B2 | 10/2006 | Holdway et al. |
| 7,128,239 B2 | 10/2006 | Skavnak |
| 2004/0251270 A1 | 12/2004 | Davis et al. |
| 2005/0211768 A1 | 9/2005 | Stillman |

FOREIGN PATENT DOCUMENTS

| | | |
|---|---|---|
| WO | WO9115833 | 4/1991 |

* cited by examiner

METHOD AND APPARATUS FOR DISPENSING FROZEN CONFECTIONARY

PRIOR APPLICATIONS

This application claims the benefit of U.S. Provisional Patent Application Nos. 60/763,512 filed Jan. 31, 2006 entitled METHOD AND APPARATUS FOR DISPENSING CONFECTIONARY, and 60/858,417 filed Nov. 9, 2006 entitled METHOD AND APPARATUS FOR DISPENSING CONFECTIONARY AND OTHER CONSUMABLES.

FIELD OF THE INVENTION

The present invention relates in general to automated dispensing/vending machines. More particularly the present invention relates to a vending machine for dispensing a frozen confectionary (such as ice cream) wherein the customer customizes his purchase by selecting from a variety of available solid and/or liquid toppings or additives, and where the purchase occasion may be enhanced by visual and/or auditory stimuli during the vending process.

BACKGROUND OF THE INVENTION

Automated machines for dispensing ice cream and other frozen confectioneries are known in the art. For example, Chirnomas (U.S. Pat. No. 5,027,698) discloses an ice cream vending machine wherein the machine dispenses pre-filled containers of ice cream. Davis et. al. (United States Patent Application 2004/0251270) describes an ice cream dispensing machine for dispensing soft-serve ice cream. Kateman et. al. (U.S. Pat. No. 7,052,728) describes a machine for vending single servings of different flavors, wherein selected flavorants are mixed into a base liquid prior to freezing. These and other automated vending devices do not provide the customer an enhanced purchase occasion in that the process of preparing and conveying the selected product is generally invisible to the customer. Alcaraz et. al. (U.S. Pat. No. 4,889,210) describes a robotic vending machine. However, in the Alcaraz patent the dispensing process is limited to transferring pre-packaged items to the customer or to placing single items (such as a beverage) into a container.

SUMMARY OF THE INVENTION

Accordingly, it is an object of the invention to provide a frozen confectionery vending machine wherein the customer can enjoy a high degree of product customization.

It is a further object of the invention that the product customization process be visually and/or aurally stimulating for the customer.

It is a further object of the invention that the product customization process includes the optional addition of one or more liquid and/or solid toppings to one or more dispensed base products, such as ice cream flavors.

Still another object of the invention is to provide a frozen confectionary vending machine having a plurality of dispensing stations for dispensing desired choices of frozen confectionery and toppings/additives.

The above as well as other objects are achieved by a frozen confectionary vending machine uniquely configured to assemble and deliver a frozen confectionary product to a user of the machine. The machine includes a housing having an interior and a transparent viewing window for viewing at least a portion of the interior of the machine. A frozen confectionary dispensing station contained within the housing dispenses a measured amount of a frozen confectionary, such as ice cream, into a product receptacle. One or more topping dispensing stations are contained within the housing with each topping dispensing station configured to dispense a measured amount of a topping into the product receptacle. A user interface enables the user to select one or more parameters of the frozen confectionary product. A product delivery port is employed for delivery of the product receptacle containing the assembled product to the user. A robotic transfer mechanism, such as a robotic arm with three dimensional movement, moves the product receptacle to the dispensing stations and to the product delivery port after assembly of the frozen confectionary product. Operation of the machine is controlled by an electronic processor based on selections entered through the user interface.

Each topping dispensing station preferably includes a topping container for containing a topping, and a topping delivery conductor for conducting the measured amount of topping into the product receptacle. Preferably, each topping container and delivery conductor are transparent to enhance the user's viewing experience. Speakers and flashing lights may also be employed to provide additional visual and aural stimuli to the user.

The present invention also provides a method for vending a frozen confectionary product. The method includes the steps of providing a vending machine having a housing with a transparent viewing window as described above. A measured amount of a frozen confectionary is dispensed into a product receptacle within the housing. A measured amount of one or more toppings is also dispensed into the product receptacle. One or more parameters of the frozen confectionary product are selected through a user interface. During assembly, the product receptacle is moved to the dispensing stations and, following assembly, is moved to product delivery port where the assembles product is accessible by the user.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings where:

DETAILED DESCRIPTION OF THE PREFERRED EMBODIMENT(S)

An attribute of the frozen confectionary vending apparatus and method described herein is that it provides a stimulating and rewarding experience to a customer in addition to a customized product. While not limited to any particular class of customers, it is anticipated that customers less than sixteen years of age may be particularly appreciative of the features of this invention.

Figure 1:
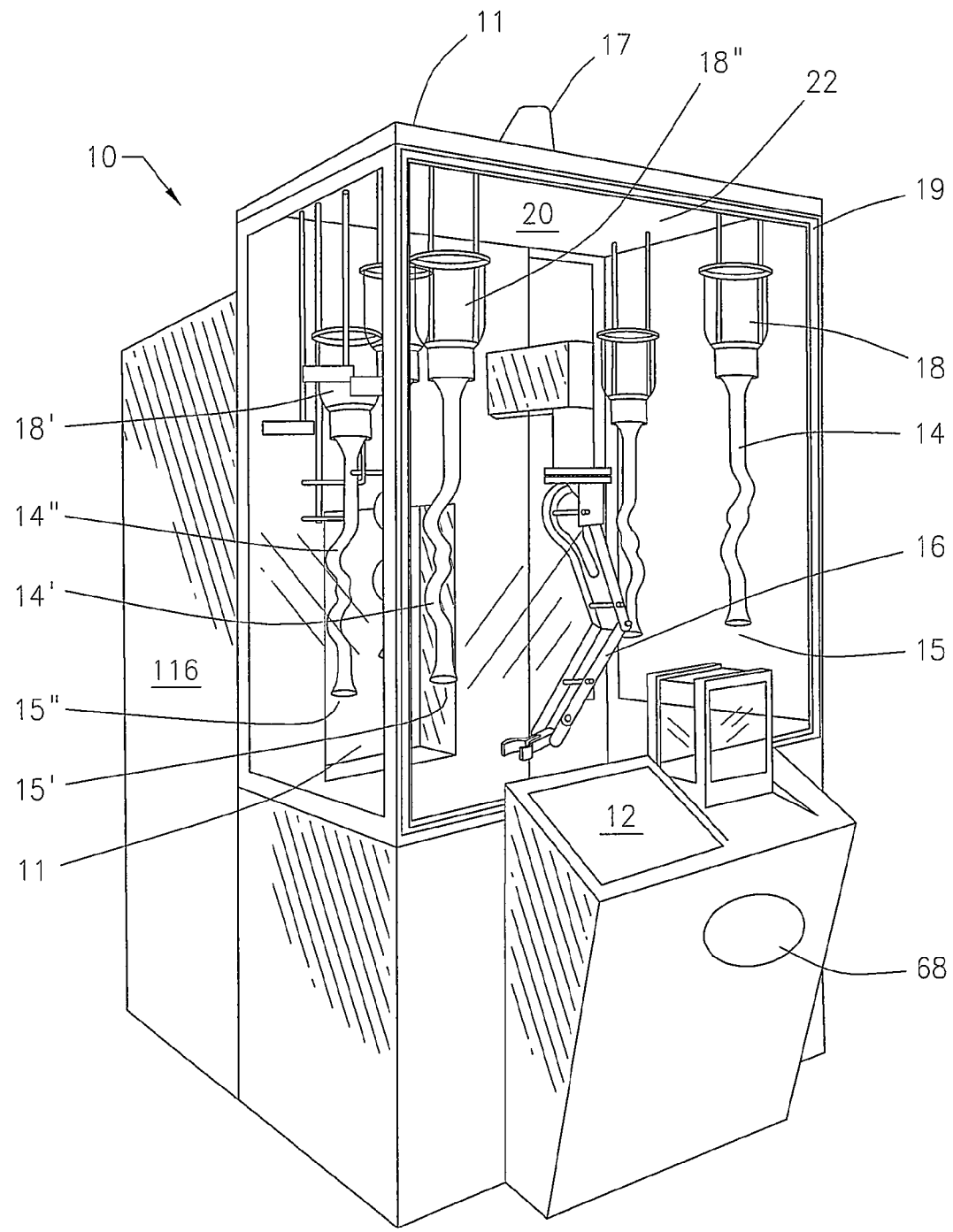
FIG. 1 is a perspective side view of a frozen confectionary vending machine according to the present invention.

Referring to FIG. 1, a frozen confectionary vending machine 10 in accordance with the invention includes a housing 11 with an interior 20 containing a frozen confectionary dispensing station 13 for dispensing a measured amount of one or more flavors of a frozen confectionary (such as ice cream, sherbert, yogurt, custard and flavored or non-flavored ice), a topping dispensing station 15 for dispensing a measured amount of topping (such as chocolate syrup or candies) from a toppings container 18 via a topping delivery conductor 14, and a robotic transfer mechanism, such as a robotic arm 16, for moving a product receptacle, such as a cup or other form of container, for the frozen confectionary product to the various dispensing stations of the machine 10 according to specifications/selections enter by a customer or other user via a user interface 12.

Figure 3:
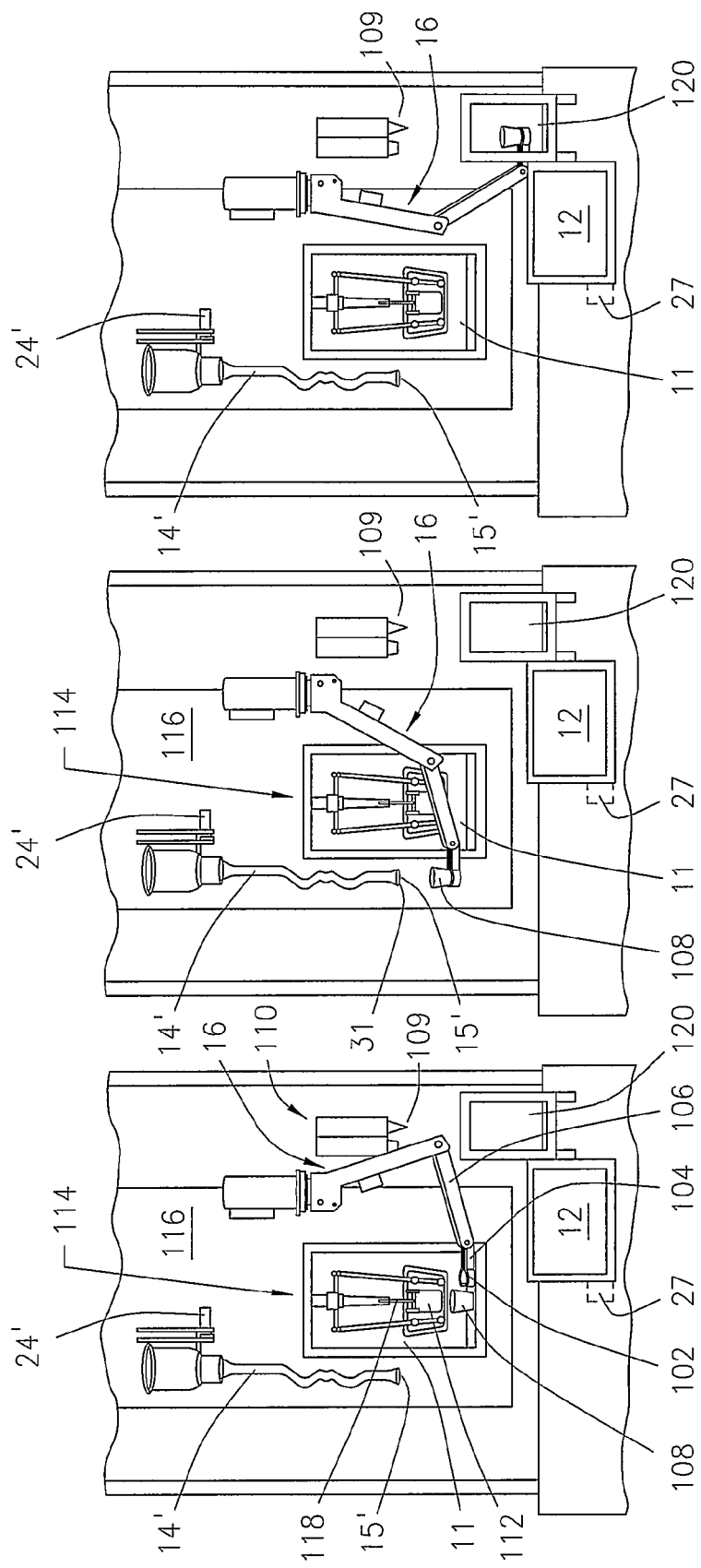
FIGS. 3A-C are sectional front views of a frozen confectionary vending machine illustrating sequential operation of the machine to assemble and deliver a frozen confectionary product according to the invention.

Housing 11 includes one or more transparent viewing windows 22 to enable the user to view the confectionary product as it is being made. Toppings container 18 as well as topping delivery conductor 14 are also preferably transparent or translucent, which advantageously enables the customer to view the topping contained therein. In a preferred embodiment as shown in FIG. 1, vending machine 10 includes a plurality of topping dispensing stations 15', 15" with transparent toppings containers 18', 18" and transparent topping deliver conductors 14', 14" to enable the user to select and view the delivery of one or more toppings from a plurality of available toppings. Vending machine 10 may incorporate additional features, including but not limited to lights 17, 19 that are controllable by an electronic processor 27 (FIGS. 3A-C) to flash, strobe, race, etc., bells, whistles, loudspeakers 68, internet access, seats, and computer games, all of which would be controllable by processor 27.

Vending machine 10 is preferably stationary during use. Mobility of the machine 10 may be enhanced by attaching casters, rollers or wheels to the bottom of the machine 10. If desired, the vending machine 10 may be self-propelled or part of a self-propelled system (i.e., such as mounted on a vehicle) to further enhance mobility.

As described above, the interior 20 of the vending machine 10 is visually accessible to the user. Such visual access may be through transparent and/or translucent glass or plastic panels 22 or panel portions, through metal or wire grids or bars, or by any combination, including by video camera, sufficiently transparent or translucent panels, and/or by any other means that provides the customer with visual access to at least desired portions of the product assembly process.

Figure 4:
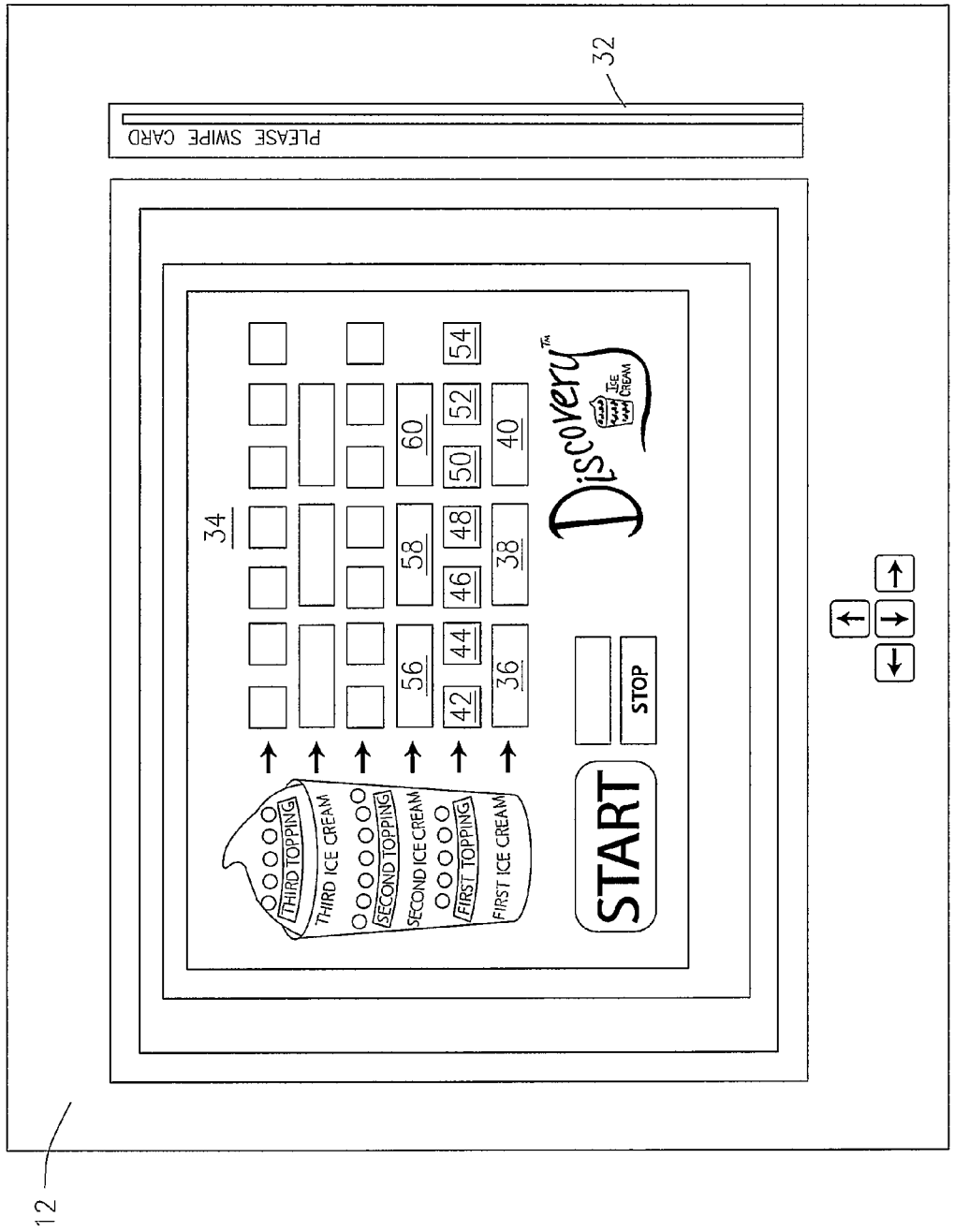
FIG. 4 is a plan view of a user interface for the vending machine of FIG. 1.

Referring to FIGS. 1 and 4, the user interface 12 is preferably positioned such that it can be comfortably and effectively operated by customers or other users who are between two feet and seven feet tall. Access to the user interface 12 may be enhanced by the presence and/or operation of stationary or retractable stairs, elevators, platforms, or any combination of these features. Such features may also be utilized by a user to increase visibility of the interior portion 20 of the vending machine 10 in order to enhance the vending occasion and/or experience.

Figure 2:
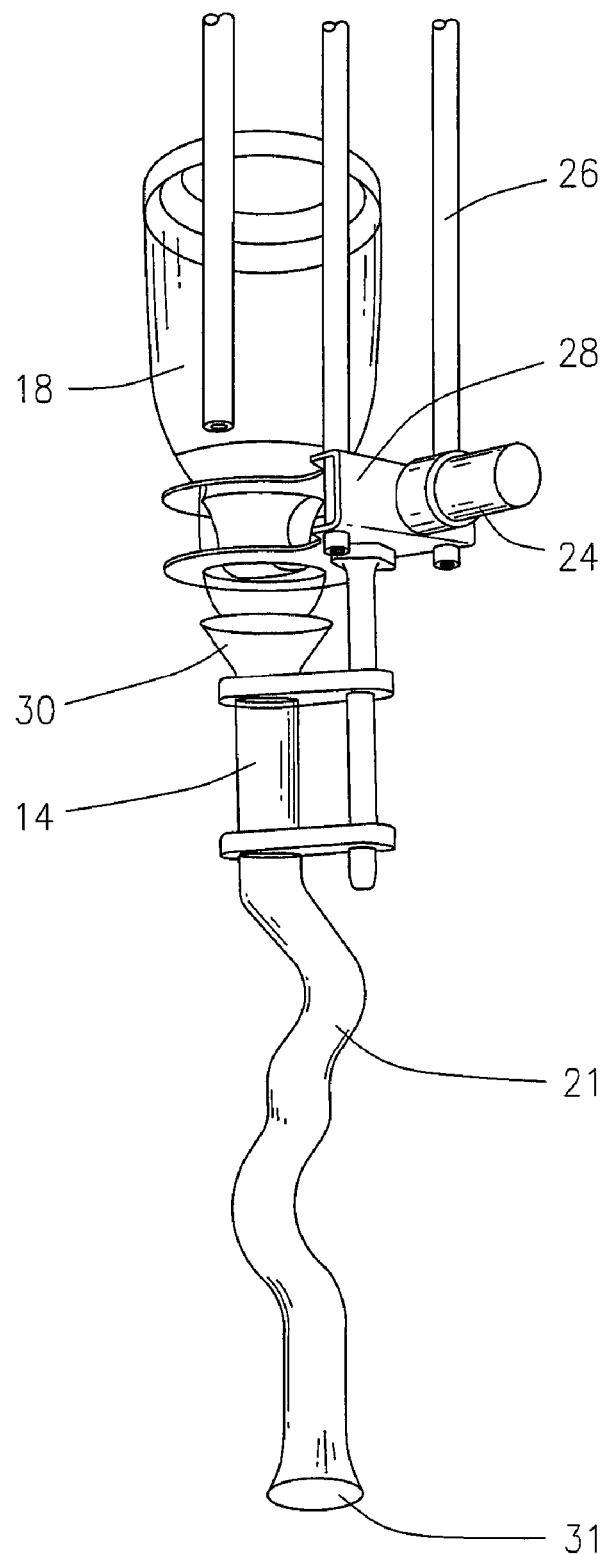
FIG. 2 is a perspective side view of a transparent topping dispensing station for a vending machine according to the invention.
Figure 5:
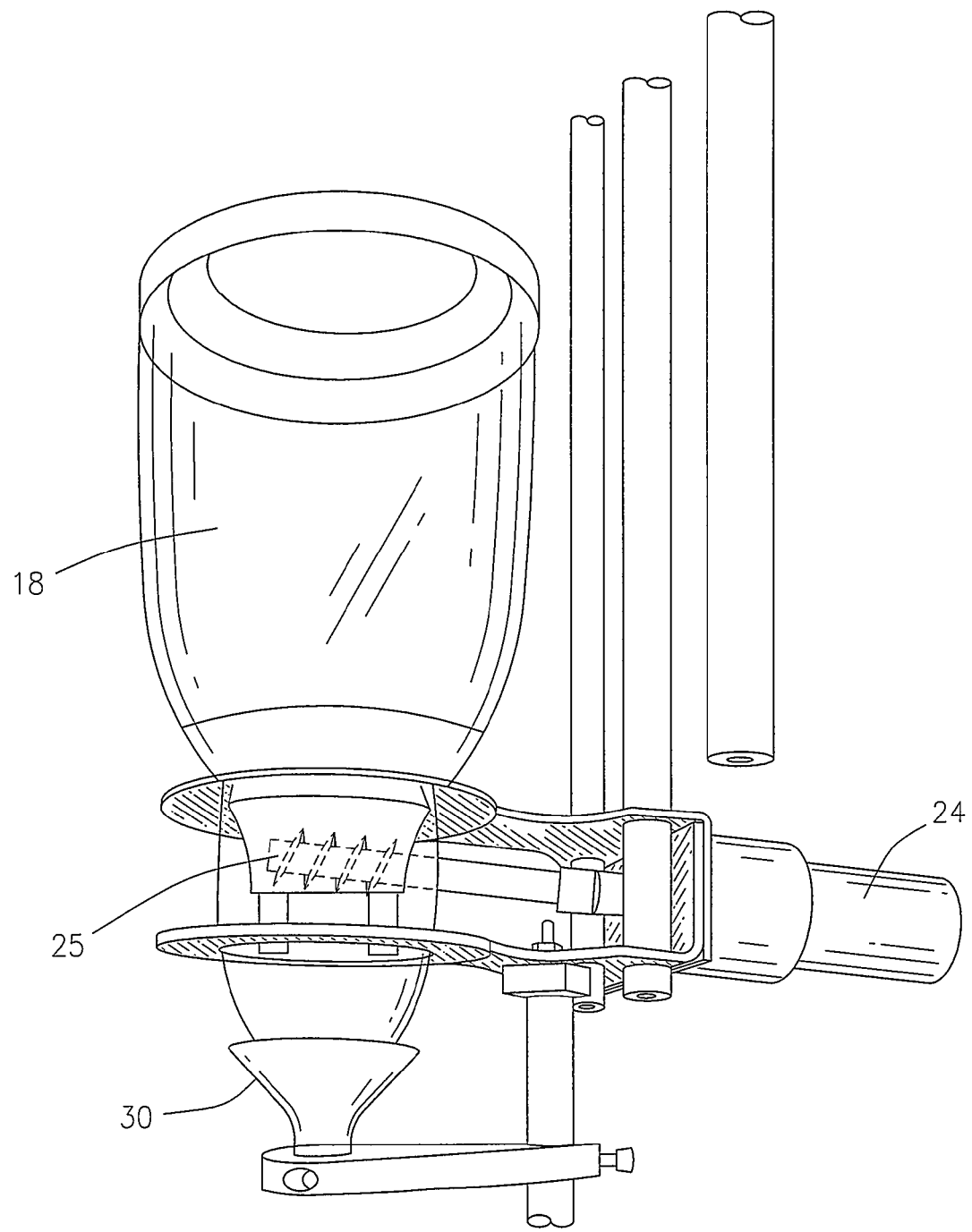
FIG. 5 is a sectional side view of a topping container and related structure for dispensing a measured amount of topping according to the invention.

Referring to FIG. 2, topping delivery conductor 14 is preferably in the form of a transparent tube. However, it will be understood that any configuration of conductor 14 suitable for delivering a measured amount of topping from container 18 to a product receptacle may be used instead. Preferably, conductor 14 is constructed in such a manner that at least a portion of the transference of one or more toppings can be viewed by the customer during the delivery process by being translucent and/or transparent and/or otherwise visible. A single conductor 14 may be utilized to transfer a single or multiple toppings. Alternatively, a plurality of conductors 14, 14', 14" can be used to transfer multiple toppings from multiple containers 18 into the product receptacle. The conductor 14 illustrated has a funnel-shaped inlet 30 (see also FIG. 5) to help ensure effective delivery/transfer of the topping into the conductor 14 and an outlet 31 (which is better seen with respect to FIGS. 3 and 4) through which the topping is delivered into the product receptacle.

With continued reference to FIG. 2, retarders 21 are preferably incorporated into conductor 14 to help retard/slow the flow of topping into the product receptacle 108 (as shown in FIG. 3b) to prevent splashing or spilling of the topping. Retarder 21 is preferably in the form of bends, curves, baffles or other such structure which lengthens the amount of time it takes for the topping to travel the length of the conductor 14. Retarders 21 may or may not be visually accessible in all embodiments, but are in a preferred embodiment. Retarders 21 of the type shown in FIG. 2 are also believed to enhance the user's viewing experience.

In addition to providing visual stimulus, the transference of any topping from a container 18 may be accompanied by sounds, including sounds naturally made by the topping passing through the conductor 14, or by artificially created sounds such as musical tunes, bells, whistles, alarms, etc. played through a speaker 68 (FIG. 6) that is operated by computer 27. Artificially created sounds may also arise from the interaction of one or more toppings with a secondary device such as a whirring, spinning wheel.

The toppings container 18 is preferably visually accessible (i.e., transparent) as illustrated. This is helpful in that it provides an attractive visual stimulus to customers as well as provides a quick way for a service technician to check the amount of topping remaining within the container 18. In order to dispense toppings from the container 18 to the conductor 14, a preferred embodiment of machine 10 employs a servo motor 24 or other force generating unit for dispensing a measured amount of toppings from the container 18 to the conductor 14 upon receipt of instructions from an electronic processor such as a computer 27 (FIGS. 3A-C) in electronic communication with the user interface 12 and motor 24. An auger 25 (FIG. 5) or other suitable structure may be driven by servo motor 24 to precisely dispense the measured amount of topping from container 18.

With reference still to FIG. 2, supports 26 are employed to support a platform 28 to which servo motor 24 is secured. In a preferred embodiment, conductor 14 is supported by (or alternatively may be used to support) platform 28, such as in the manner illustrated in FIG. 2, and provides an aesthetically pleasing appearance without interfering with the operation of servo motor 24 or auger 25 during dispensing of toppings into a product receptacle 108, as shown in FIG. 3b. Scooping mechanisms, valve based systems, or other dispensing arrangements may be employed in other embodiments.

Referring to FIGS. 3A-3C, robotic arm 16 may be constructed of any materials suitable for transferring the product receptacle to the various dispensing stations 11, 15' and product delivery port 120. For purposes of illustration, only one topping dispensing station 15' is shown in FIGS. 3A-C. Movement of the robotic arm 16 is preferably controlled by a computer 27 that is programmed to move the aim 16 according to selections/instructions entered by the customer through the user interface 12. Alternatively, robotic arm 16 may be at least partially controlled or controllable by the customer through the user interface 12. More than one robotic aim 16 may be utilized as needed or desired.

The robotic arm 16 preferably has at least three axes of movement, which is largely enabled by the use of pivoting links 104, 106. More specifically, robotic arm 16 is capable of movement in a horizontal left-to-right dimension (x-axis), a horizontal front-to-back dimension (y-axis), and a vertical up-and-down dimension (z-axis). Hand 102, which is used to grasp and hold product receptacle 108, is carried by robotic arm 16 as it moves in three dimensions. Other robotic transfer mechanisms may be utilized in conjunction with and/or in place of the robotic arm 16.

With reference to FIGS. 3A-C in sequence, FIG. 3A shows that during an exemplary product assembly and delivery process, link 104 is maintained in a constant horizontal attitude as robotic arm 16 moves in at least three dimensions so that the product receptacle 108, in this case an inedible cup 108, can be transported without spilling any of its contents. Receptacle 108 can be moved elevationally as well as horizontally over a significant left to right range, as well as forward and backward.

In FIG. 3A, an empty receptacle or cup 108 has been removed from product receptacle dispenser 110, which preferably includes at least two types of products receptacles (such as an inedible cup and an edible cone) that are selectable by the user through the user interface 12. The receptacle 108 is moved by the robotic arm 16 to the various dispensing stations 11, 15', including product receptacle dispensing station 109. Frozen confectionary product dispensing station 11 includes an outlet 112 for a frozen confectionary product dispenser shown generally at 114. Dispenser 114 is preferably configured to dispense two or more types and/or flavors of frozen confectionary product. Preferably, the dispenser 114 can dispense at least three if not four or more flavors. The frozen confectionary products are preferably stored in a frozen or chilled condition in a cooler shown generally at 116. The particular types and/or flavors to be dispensed is preferably controlled by computer 27 through selections entered at user interface 12. Once receptacle 108 is at least partially filled with frozen confectionary, the product receptacle 108 is moved to topping dispensing station 15' and positioned below the outlet 31 conductor 14'. A signal is output by computer 27 to instruct motor 24' to dispense a measure amount of topping into the product receptacle 108 on top of at least a first layer of frozen confectionary. Alternatively, a topping may be dispensed into receptacle 108 before any frozen confectionary is dispensed. In addition, multiple toppings and/or confectionary products may be layered into receptacle 108 (i.e., a layer of coolie portions followed by a layer of chocolate syrup followed by a layer of ice cream or other combination) as dictated by customer selections entered through the user interface 12.

With further reference to FIGS. 3A-C, a mixing assembly 118 may be employed (such as with air or mechanical mixing/stirring devices) to assist in mixing the frozen confectionary and topping(s) in receptacle 108. Following assembly of the frozen confectionary product, receptacle 108 is moved to product delivery port 120 where it is received by the customer.

A preferred embodiment of the user interface 12, shown in FIG. 4, includes a touch screen panel 34. Alternative forms of a user interface, such as keyboard, keypads, knobs, wheels, push buttons, switches, joysticks, etc., or combinations thereof, may be employed as well. The user interface 12 is preferably interactive with the customer, providing visual and/or auditory feedback regarding the customer's selections. In addition, the user interface 12 may provide additional stimulation to the customer in the form of questions that may be answered and opportunities to change selections. It is anticipated that the user interface 12 may also provide customers an opportunity to test their knowledge and/or skill in return for a greater product portion and/or additional toppings.

The user interface 12 is also preferably configured to provide a means for the customer to tender payment for the vended product, such as with a credit/debit card reader 32. Alternatively, a customer payment device is separate from the user interface 12. Other payment systems include, but are not limited to, bill acceptors, coin acceptors, token acceptors, credit card scanners, ID and password input devices, retinal scanners, fingerprint scanners, devices that communicate with the customer's cellular phone, and any other suitable form of payment technology. The user interface 12 is in electronic communication with computer 27, which provides signals to operate robotic arm 16, servo motor 24, flashing lights 17, 19, speaker 68, and possibly other activatable components of the vending machine 10.

As can be seen from the user interface 12 of FIG. 4, a touch screen panel 34 is provided in which a first frozen confectionary selection can be made from among a first group of frozen confectionary selections 36, 38, 40, each of which may represent a different type and/or flavor (or combinations of types and/or flavors) of frozen confectionary such as ice cream. The user can also select one or more toppings from a first group of topping choices 42, 44, 46, 48, 50, 52, 54, 56, each of which may represent a single topping type and/or flavor (such as chocolate syrup, caramel syrup, various nuts, various candies, granola, etc.) or a combination of such toppings. A second group of topping selections 56, 58, 60 may also be provided to enable the user to specify multiple layers of frozen confectionaries and toppings as desired. Mixing of the dispensed ingredients may be accomplished with mixer 118, which is in electronic communication with computer 27.

Figure 6:
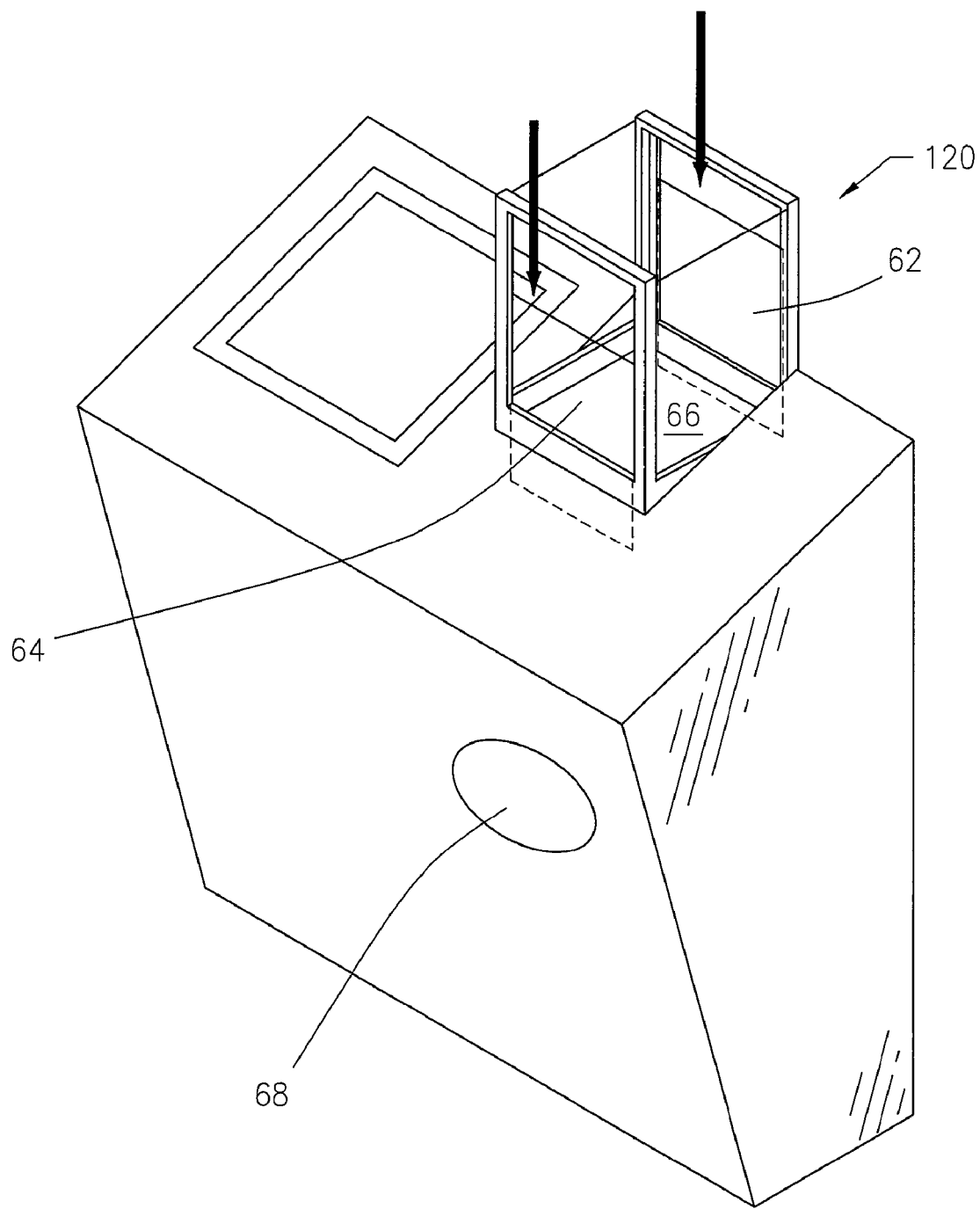
FIG. 6 is a perspective side view of a product delivery port for a vending machine according to the invention.

Referring to FIG. 6, a preferred embodiment of a product delivery port 120 includes an internal door 62 operable by computer 27 that separates the interior 20 of the vending machine 10 from the exterior. Internal door 62 functions to ensure a sanitary barrier between the interior 20 and the exterior of the vending machine 10 and prevents customers from accessing and potentially contaminating the interior 20 of the vending machine 10. An external door 64 is preferably provided to enable the customer to access the assembled product. The two doors 62, 64 define an intermediate surface 66 to which the assembled product is delivered by robotic arm 16. Doors 62, 64 are preferably interlocked in a way that prevents both doors from being open at any point in time, which prevents unauthorized physical access to the interior 20 of the vending machine 10.

In one preferred embodiment, the vending machine 10 of the present invention is capable of providing at least three different ice cream flavors and at least six different toppings. The order of the addition of the different flavors and the different toppings may be controllable by the customer. Examples of ice cream flavors that may be supplied include but are not limited to vanilla, chocolate, and various fruit flavors. Each ice cream flavor may be supplied as a pre-formulated product or as a base wherein the flavorants are added at the time of selection by the customer. It will be understood that the method in which the ice cream is produced, formulated, and dispensed may be implemented in various ways. For example, ice cream may either be mixed and frozen fresh by the machine 10 or made offsite and delivered to the machine 10. Any suitable automated method for dispensing the ice cream or other frozen confectionary may be employed.

Examples of toppings that may be dispensed include but are not limited to hard candies such as M&Ms™; soft candies such as Gummi Bears™, fruits such as raisins, dried pineapple or cherries; nuts, sauces, syrups, cookie crumbs, cookie dough, granola, or other liquid and/or solid based topping. In addition to their use as toppings, the toppings may be admixed as an admixture into any selected ice cream flavor to create an ice cream admixture. For example, blending of cookie crumbs or chocolate syrup into vanilla ice cream by the vending machine could provide an ice cream admixture.

In one hypothetical scenario, for each serving of ice cream there may be up to three different choices of ice cream selected and three different toppings, with each topping chosen from six available toppings. In this scenario, there would be over 5,000 distinct possible combinations selectable by the user.

In addition to the ability to provide a highly customized product, another element of a preferred embodiment is the provision of an auditorily and/or visually stimulating experience for the customer, such as with dynamic or interactive control as described herein. Accordingly, an element of the present invention is that at least a significant portion of the preparation of the customized product is visible to the customer. Visual access to the preparation of the customized product can be achieved by the use of transparent conveyances, transparent storage containers, and visual contact with interior portions of the vending machine 10 through such means as, for example, transparent panels, wire grids, television monitors, or the like. Furthermore, it is anticipated that the visible interior portions of the vending machine 10 provide visual stimulation through motion of the at least robotic arm 16, movement of the toppings, and movement of the product receptacle 108. In a preferred embodiment, the vending machine 10 of the present invention may provide additional stimulation by allowing enhanced interaction with the customer through the user interface 12, wherein in addition to receiving commands from the customer, the user interface 12 may allow at least partial interactive control of the product assembly/dispensing process. In yet another preferred embodiment, the user interface 12 may provide the customer with additional stimulation and interaction by providing opportunities for the customer to exhibit mental or physical dexterity prior to or concurrent with the assembly of the product, with rewards for success in exhibiting such mental or physical dexterity.

While the foregoing description has been directed toward the dispensing of frozen confectionery based products, it will be understood that the scope of the present invention encompasses the delivery of other customizable products to a customer in a visually and/or aurally stimulating manner, perhaps in a dynamically interactive manner. For example, a vending machine may be configured to assemble and dispense hot beverages (such as coffee, tea and cocoa). In the example of a coffee vending machine, a specific coffee type (i.e., dark roast, expresso, decaffeinated, etc.) is combined with additives such as whipped cream topping, chocolate flakes, sugar, creamers, spices, flavors of various kinds, etc. to provide a customized product. Customer performance related benefits may be available as well, such as the provision of more of a topping for a certain performance level or other dynamically interactive feature. As a further example of customizable products suitable the invention, pre-manufactured crayons could be assembled in accordance with the desires of a customer. For this product, the customer is able to select a specific set of colors that will comprise the assembled crayon package (i.e., 2 red and 3 blue in a package of 5 crayons, or which 8 of 15 colors are provided, etc.).

Exemplary embodiments of the invention will now be illustrated in the following examples, which are not to be construed as encompassing all possible embodiments.

EXAMPLE 1

Ice Cream/Toppings Treat

A vending machine 10 of the present invention possesses three separate ice cream flavors and six different toppings. Each topping is contained in a separate transparent toppings container 18 that is placed directly over a transparent, multi-bend plastic tube or conductor 14. Adjacent the bottom of each toppings container 18 is an auger 25, paddle wheel, or other measuring/dispensing mechanism. The vending machine 10 is activated by a customer by the process of swiping a credit card at the user interface 12. The user interface 12 then asks the customer to select his or her first ice cream flavor using a touch screen. After the first flavor is selected, the user interface 12 asks the customer to select the first topping using the same touch screen. The user interface 12 then asks if the customer would like to select a second ice cream, followed by a second topping, etc. until the customer indicates no additional ice cream flavors or toppings are desired, or a predetermined number of toppings and ice creams have been selected.

The robotic arm 16 then acquires a product receptacle 108 (which may also be selectable by the user) from a product receptacle dispenser 110 and places the product receptacle 108 under a first ice cream dispenser 114. Next the robotic arm 16 moves the product receptacle 108 to a position below the outlet 31 of the conductor 14 that connects to a selected toppings container 18. The auger 25 is then activated with servo motor 24 to deliver a measured amount of the first selected topping to the top of the conductor 14, whereupon the selected topping is transported by gravity atop the ice cream in the product receptacle 108. After delivery of the first topping is complete, the robotic arm 16 moves the product receptacle 108 to the next selected ice cream dispenser 114, followed by positioning the receptacle 108 below the outlet 31 of the second selected toppings visual conveyance 14, etc., until the product as specified by the customer is fully assembled. The robotic arm 16 then places the filled product receptacle 108 at a dispensing station 120 where it is transported through the first door mechanism 62 to be retrieved by the customer.

EXAMPLE 2

Ice Cream/Toppings Treat

A vending machine 10 of the present invention possesses one ice cream flavor and five different toppings. Each topping is contained in a separate transparent toppings container that is placed directly over a transparent, coiled glass tube or conductor 14. The bottom of each toppings container possesses an auger or paddle wheel. The vending machine 10 is activated by a customer inserting a token. The user interface touch screen panel 34 then asks the customer to select the topping that will be on top, in the middle and on the lowest level. In this example, the ice cream treat that is made will possess a total of six layers; with ice cream in layers 1, 3, and 5 (from the bottom to top) and toppings in layers 2, 4, and 6. The robotic arm 16 then acquires a product receptacle 108 from a product receptacle dispensing station 109 and places the product receptacle 108 under a first ice cream dispenser 114. Next, the robotic arm 16 then moves the product receptacle to a position below the outlet 31 of the transparent conductor 14 that connects to the selected toppings container. The auger 25 is then activated to deliver a measured amount of the first selected topping to the top of the transparent conductor 14, whereupon the selected topping is transported by gravity to the top of the ice cream in the product receptacle 108. After delivery of the first topping is complete, the robotic arm 16 moves the product receptacle 108 to the next selected ice cream dispenser 114, followed by positioning below the outlet 31 of the second selected toppings transparent conductor 14, etc., until the product is fully assembled. The robotic arm 16 then places the filled product receptacle 108 at port 120 where it will be transported through the door mechanism 62 where it can be retrieved by the customer.

EXAMPLE 3

Crushed Ice Treat

A vending machine 10 of the present invention possesses ice that is crushed and/or generated and six different liquid toppings (lemon-lime, orange, banana, watermelon, cherry, and grape). Each topping is contained in a separate transparent toppings container 18 that is placed directly over a transparent, coiled glass tube conductor 14. The bottom of each toppings container 18 possesses a valve for controlling the amount of topping that will be dispensed. The vending machine 10 is activated by a customer inserting a token. The user interface touch screen panel 34 then asks the customer to select three toppings. The robotic arm 16 then acquires a product receptacle 108 from a product receptacle dispensing station 109 and places the product receptacle 108 below the ice dispenser 114. Next, the robotic arm 16 then moves the product receptacle 108 to a position below the outlet 31 of the transparent conductor 14 that connects to the selected toppings container 18. The valve is then activated to deliver a measured amount of the first selected topping to the top of the transparent conductor 14, whereupon the selected topping is transported by gravity to the top of the crushed ice in the product receptacle 108. After delivery of the first topping is complete, the robotic arm 16 moves the product receptacle 108 to the next selected topping dispensing station 15 and then again until the product is fully assembled. The robotic arm 16 then moves the filled product receptacle 108 to port 120 where it is transported through the door mechanism 62 where it can be retrieved by the customer.

EXAMPLE 4

Espresso/Cappuccino/Coffee

A vending machine 10 of the present invention possesses espresso/cappuccino/coffee made real time by an existing espresso/cappuccino/coffee machine, steamed or frozen/slurry milk and multiple liquid flavoring options/toppings and other various and sundry toppings. Each flavoring and the milk are contained in separate transparent containers 18 that are placed directly over a transparent, coiled glass tube conductor 14. The bottom of each container 18 includes a valve for controlling the amount of flavoring/milk that will be dispensed. A customer inserting a token activates the vending machine 10. The user interface touch screen panel 34 then allows the customer to select the type of coffee, the flavor, the milk (slurry or steamed) as well as other topping options that may be available such as whipped cream, chocolate powder, sprinkles, cinnamon, and the like. The robotic arm 16 then acquires a product receptacle 108 from a product receptacle dispenser 110 and places the product receptacle 108 below the espresso/cappuccino/coffee dispenser 114, which receives the freshly made espresso/cappuccino/coffee. The robotic arm 16 then moves the product receptacle 108 to a position below the outlet 31 of the transparent conductor 14 that connects to the selected flavor container 18. The valve is then activated to deliver a measured amount of the selected flavor to the top of the transparent conductor 14, whereupon the selected flavoring is transported by gravity to mix with the espresso/cappuccino/coffee in the product receptacle 108. After delivery of the flavoring, the robotic arm 16 moves the product receptacle 108 to the steamed or slurry milk and then other selected toppings until the product is fully assembled. The robotic arm 16 then places the filled product receptacle 108 at port 120 where it is transported through the door mechanism 62 where the customer can retrieve it.

Although frozen confectionary type products have been discussed primarily above, it will be understood by immediately preceding description that coffee based beverages could also be provided, whether hot or cold, along with various other products, such as providing the ability to decorate a cake with a selected design and watching the decoration take place on top of a selected flavor of cake, or providing the ability to assemble an assortment of candies (such as multiple flavors of jelly beans). Additionally, while the robotic arm 16 principally moves the product receptacle 108, it could also be utilized to move at least an outlet of a dispenser such as of ice cream, toppings, etc. relative to a product receptacle 108 while allowing viewing of at least a portion of the process by the customer.

Thus, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A frozen confectionary vending machine for assembling and delivering a frozen confectionary product to a user of the machine, said machine comprising: a housing having an interior and a transparent viewing window for viewing at least a portion of the interior by a user of the machine; a frozen confectionary dispensing station contained at a first location within the housing for dispensing a measured amount of a frozen confectionary into a product receptacle; a first topping dispensing station contained within the housing at a second location that is spaced a distance away from the first location; a second topping station that is disposed at a third location spaced a distance away from each of the first and second locations, wherein each of said first and second topping dispensing stations is configured to dispense a measured amount of a topping into the product receptacle; a user interface for selecting at least three parameters for the assembly of the frozen confectionary product; a product delivery port for delivering the product receptacle containing the assembled frozen confectionary product to the user; a robotic transfer mechanism for moving the product receptacle between the first, second and third locations for the assembly of the frozen confectionary product and for moving the assembled frozen confectionary product from one of the first, second and third locations to the product delivery port; and an electronic processor for controlling operation of the machine based on selections entered through the user interface.

2. The vending machine of claim 1 wherein each of said first and second topping dispensing stations includes: a topping container for containing a topping; and a topping delivery conductor for conducting said measured amount of topping into the product receptacle.

3. The vending machine of claim 2 wherein said topping container and said topping delivery conductor are transparent and are visible through the viewing window.

4. The vending machine of claim 2 wherein said topping delivery conductor includes a retarder for retarding the flow of topping into the product receptacle.

5. The vending machine of claim 1 wherein said transfer mechanism comprises a robotic arm having a three dimensional range of motion; and wherein the robotic arm includes a first gripping surface and second gripping surface configured to engage a portion of a side wall of the product receptacle such that the product receptacle is gripped between the first and second gripping surfaces.

6. The vending machine of claim 1, further comprising a speaker controllable by said electronic processor to provide auditory stimulation to the user at least during assembly of the frozen confectionary product.

7. The vending machine of claim 1, further comprising one or more flashing or strobing lights controllable by said electronic processor to provide visual stimulation to the user at least during assembly of the frozen confectionary product.

8. The vending machine of claim 1 wherein said frozen confectionary is selected from the group consisting of ice cream, sherbet, yogurt, custard, flavored ice, and non-flavored ice.

9. The vending machine of claim 1 wherein said user interface includes a touch-screen input device.

10. The vending machine of claim 1 wherein each of said first and second topping dispensing stations includes: an electric motor; and an auger driven by said motor to deliver said measured amount of topping into the product receptacle.

11. The vending machine of claim 1, further comprising a payment input device coupled to the processor for accepting payment from the user for the frozen confectionary product.

12. The vending machine of claim 1 wherein said one or more parameters include product receptacle type.

13. The vending machine of claim 1 wherein said one or more parameters include frozen confectionary type.

14. The vending machine of claim 1 wherein said one or more parameters include type of topping.

15. The vending machine of claim 1, further comprising one or more additional dispensing stations, each of the additional dispensing stations being disposed at a location that is spaced distance away from each of the first, second, and third locations, and from the product delivery port; and wherein the one or more additional dispensing stations are configured to dispense one of an additional frozen confectionary and a topping; and wherein the robotic transfer mechanism moves the product receptacle additionally between the locations of the one or more additional dispensing stations and the first, second and third locations for the assembly of the frozen confectionary product and moves the assembled frozen confectionary product from one of the first, second and third locations and the additional locations to the product delivery port.

16. A frozen confectionary vending machine for assembling and delivering a frozen confectionary product to a user of the machine, said machine comprising: a housing having an interior and a transparent viewing window for viewing at least a portion of the interior by a user of the machine; a frozen confectionary dispensing station contained within the housing for dispensing a measured amount of a frozen confectionary into a product receptacle; one or more topping dispensing stations contained within the housing, each of said frozen confectionary dispensing station and one or more topping stations being positioned at locations each spaced a distance away from each other, each of said one or more topping dispensing stations configured to dispense a measured amount of a topping into the product receptacle; a user interface for selecting one or more parameters of the frozen confectionary product; a product delivery port for delivering the product receptacle containing the frozen confectionary product to the user; a robotic arm movable in three dimensions for moving the product receptacle between the locations of the frozen confectionary dispensing station and the one or more topping stations for progressive assembly of the frozen confectionary product and for moving the assembled frozen confectionary product from one of the locations of the frozen confectionary dispensing station and the one or more topping stations to the product delivery port; and an electronic processor for controlling operation of the machine based on selections entered through the user interface.

17. The vending machine of claim 16 wherein each of said one or more topping dispensing stations includes: a topping container for containing a topping; and a topping delivery conductor for conducting said measured amount of topping into the product receptacle.

18. The vending machine of claim 17 wherein said topping container and said topping delivery conductor are transparent.

19. The vending machine of claim 17 wherein said topping delivery conductor includes a retarder for retarding the flow of topping into the product receptacle.

20. The vending machine of claim 16, further comprising a speaker controllable by said electronic processor to provide auditory stimulation to the user at least during assembly of the frozen confectionary product.

21. The vending machine of claim 16, further comprising one or more flashing or strobing lights controllable by said electronic processor to provide visual stimulation to the user at least during assembly of the frozen confectionary product.

22. A method for vending a frozen confectionary product comprising: providing a vending machine having a housing with an interior and a transparent viewing window for viewing at least a portion of the interior by a user of the machine; selecting through a user interface one or more parameters of the frozen confectionary product; dispensing, within the housing at a first location, a measured amount of a frozen confectionary product into a product receptacle;
moving the product receptacle from the first location to a second location within the housing; dispensing, at the second location, a measured amount of one or more toppings into the product receptacle; and moving the product receptacle to dispensing stations disposed at other locations within the housing during assembly of the product and, after the frozen confectionary product is assembled, moving the product receptacle from one of the dispensing stations to a product delivery port where the assembled product is accessible by the user.

23. A method for vending a frozen confectionary product comprising:
providing a vending machine having a housing with an interior and a transparent viewing window for viewing at least a portion of the interior by a user of the machine;
selecting through a user interface one or more ingredients to be incorporated into the frozen confectionary product; dispensing, within the housing at a first location, a measured amount of a first selected ingredient into a product receptacle; moving the product receptacle to a second location within the housing spaced a distance away from the first location; dispensing, at the second location, a measured amount of a second selected ingredient into the product receptacle, and moving the product receptacle from the second location to a product delivery port spaced a distance away from the second location, and the product receptacle is accessible to the user at the product delivery port.

24. The method as defined in claim 23, wherein the step of moving the product receptacle from the first location to the second location, and from the second location to the product delivery port includes engaging the product receptacle with a gripping end of a robotic arm.

25. The method as defined in claim 24, wherein the step of engaging the product receptacle with the gripping end of a robotic arm includes contacting a first side region of the product receptacle with a first gripping surface and contacting an opposing second side region of the product receptacle with a second gripping surface; and retaining the product receptacle between the first and second gripping surfaces from immediately prior to dispensing the first ingredient into the product receptacle until the product receptacle is positioned adjacent the product delivery port.

26. The method as defined in claim 23, wherein the steps of moving the product receptacle between the first location and the second location and the second location and the product delivery exit includes the step of controlling the movement of the product receptacle entirely by way of a central processor and is free of human intervention after entry of the selection parameters into the user interface.

* * * * *